United States Patent [19]

Ferlan

[11] 4,206,444
[45] Jun. 3, 1980

[54] REMOTE POWER CONTROLLER UTILIZING COMMUNICATION LINES

[75] Inventor: Arthur P. Ferlan, Nashua, N.H.

[73] Assignee: Honeywell Information Systems Inc., Waltham, Mass.

[21] Appl. No.: 461

[22] Filed: Jan. 2, 1979

[51] Int. Cl.² .............................................. H04Q 11/00
[52] U.S. Cl. ................................ 340/147 R; 340/163; 340/310 A
[58] Field of Search ............ 340/147 R, 163, 146.1 C, 340/310 R, 310 A; 179/2 DP

[56] References Cited
U.S. PATENT DOCUMENTS 3,427,589  2/1969  Robinson .......................... 340/163 X Primary Examiner—Harold I. Pitts
Attorney, Agent, or Firm—Nicholas Prasinos; Ronald T. Reiling

[57] ABSTRACT

A remote power controller for turning computer power on and off from a remote site. Standard data communication lines are utilized to transmit the control and identification signals.

14 Claims, 4 Drawing Figures

REMOTE POWER CONTROLLER UTILIZING COMMUNICATION LINES

BACKGROUND OF THE INVENTION

1. Field of the Invention

This invention relates generally to a remote control system for powering up and powering down electrically driven equipment and more particularly computer power equipment from a remote site utilizing standard communication lines to transmit the control and identification signals.

2. Description of the Prior Art

According to a conclusion of a million dollar study carried out for the Datron Corporation by Booz, Allen, and Hamilton, computers in the United States alone will transmit or receive 250 billion data transactions over telecommunication lines by the year 1980.

Computer systems are beginning to utilize the vast network of telecommunication links that span the industrialized countries of the world, carrying telephone, telegraph, and television signals. It is now practical for one computer to dial up another computer and transmit information. Typical devices for accomplishing this utilizing telephone lines are disclosed in U.S. Pat. Nos. 3,347,988 issued Oct. 17, 1967 and 3,631,395 issued Dec. 28, 1971.

However, in these typical prior art communication systems the computer systems remain in a powered-up condition regardless of whether or not the computer is receiving or transmitting information. Yet the bulk of computer communication is "off-line" wherein telecommunication data to be transmitted to a remote computer are first written onto magnetic tape or disk, or punched into paper tape or cards for later transmission to the remote computer during off-load hours. The transmission of the batch of data may take anywhere from a few minutes to a few hours and is generally done at night or weekends. Despite the fact that only a relatively short time is required for the actual transmission of data the computer power remains on all night or all weekend. In this day and age of power conservation, it is desirable to have a device for turning power on and off remotely so that power is being expended only during actual transmission of data.

There are a number of devices available in the prior art for performing various functions remotely. N. G. Duncan discloses a "Remote-Control System With Coded Audio Signals" in U.S. Pat. No. 3,384,713 issued May 21, 1968 wherein sound generator means are utilized to remotely control a terminal circuit. In U.S. Pat. No. 3,484,694 entitled "Data Transmission System Wherein System Control is Divided Between a Plurality of Levels for Remote Location Activation," A. Brothman, et al disclosed a data processing center having a quiescent operating state wherein all the remote locations of the system are sequentially sensed so as to transmit their readings back to the data processing center. Other typical remotely controlled systems are disclosed in the following U.S. Pat. Nos. (a) 3,384,713 issued May 21, 1968; (b) 3,705,385 issued Dec. 5, 1972. This list is not inclusive and there may be other similar remotely controlled data transmitting and receiving systems of which the applicant is not aware. Most of these devices are directed to controlling the reading of meters requiring fairly low power, audio signals, and/or more than one frequency for transmitting and receiving control signals, and in many instances are expensive to manufacture, install and maintain. What is needed is a simple, reliable low cost device, easy to install and easy to maintain that can distinguish as well when wrong numbers are called via the telephone transmission line.

OBJECTS OF THE INVENTION

It is therefore a primary object of the invention to provide an improved remote power controller utilizing communication lines.

It is another object of the invention to provide a remote power controller for turning computer power on and off from a remote site.

It is still a further object of the invention to provide a remote power controller for turning computer power on and off from a remote site utilizing standard data communication lines to transmit the control and identification signals.

It is still another object of the invention to maintain security and privacy of remotely stored computerized records by requiring that an encoded message is transmitted by the central site for identification and acceptance by the remote power controller prior to taking further action.

SUMMARY OF THE INVENTION

The foregoing objects are achieved according to one embodiment of the invention and according to one mode of operation thereof, by providing a remote power controller for powering up and powering down computer power equipment. A call is made from a central site to a remote site utilizing standard data communication lines such as for example Dataphone$^{(R)}$ Services. Upon acknowledgement by a transponder, the central site transmits an encoded message to identify itself and to indicate the equipment that is to be powered up or powered down. The invention verifies this information and if acceptable, enables a gate to apply the signal to relays which apply power to the designated equipment. After completing the transmission, the central site "hangs-up;" the remote power controller cuts the power to the computer "off" and returns to its stand-by state.

BRIEF DESCRIPTION OF THE DRAWINGS

The novel features which are characteristic of this invention are set forth with particularity in the appended claims. The invention itself, however, both as to its organization and operation together with further objects and advantages thereof may best be understood by reference to the following description taken in connection with the accompanying drawings in which:

DETAILED DESCRIPTION OF THE PREFERRED EMBODIMENT

Figure 1A:
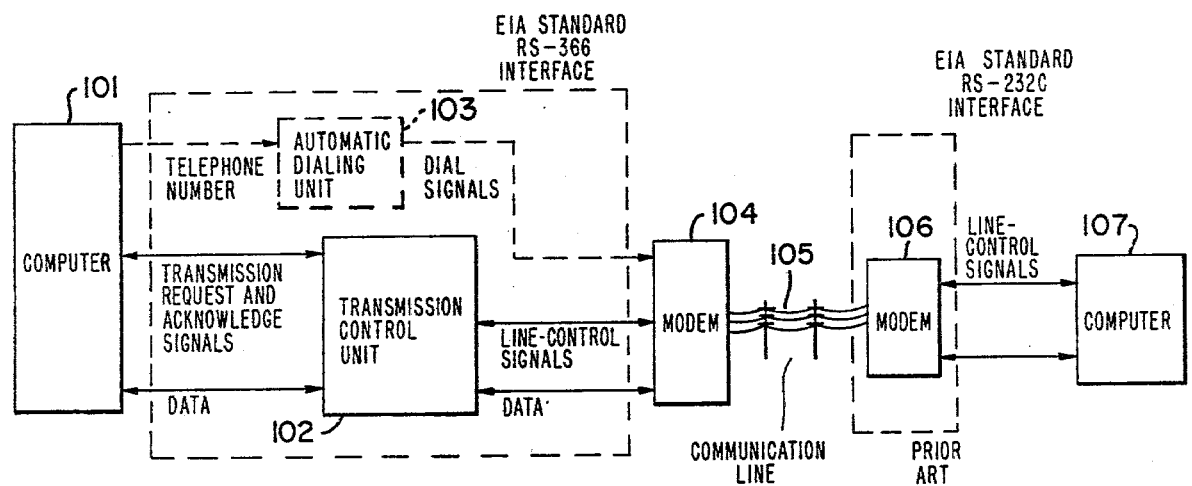
FIG. 1A is a block diagram illustrating a standard prior art off line system within which the invention operates.

Referring now to FIG. 1A there is shown a prior art computer communication system with which this invention may be practiced. With this type of system, the remote site computer 107 must be powered continually irrespective of whether or not the central site computer 101 is transmitting or not. In order to transmit data in this prior art computer communication system, the computer 101 dials the telephone number of the remote site computer 107 via automatic dialing unit 103; of course, manual dialing could also be utilized. Dial signals are sent to the modem 104 which then sends line control signals to transmission control unit 102 in order to start the dialog to transmit data. Transmission control unit 103 is a standard interface between a modem 104 and a computer 101 and is referred to as the EIA RS-232-C (Electronic Industries Association) Standard. These standard interface units receive, generate and send various signals as follows:

1. Data signals.
   (a) Transmitted Data (to the modem).
      Data generated by the terminal or computer for transmission.
   (b) Receive Data (to the terminal or computer).
      Data received by the modem for the terminal.
2. Timing signals.
   (a) Transmitter Signal Element Timing.
      Two connections are defined. One sends signal element timing information from the transmitting terminal for computer system to its modem. The other sends timing information from the transmitting modem through its terminal or computer.
   (b) Receiver Signal Element Timing.
      Two connections are defined. One sends signal element timing information from the receiving terminal to its modem or computer system. The other sends timing information from the receiving modem to its terminal.
   The timing signal connections are optional.
   A modem for Start-Stop transmission does not use them.
3. Control Signals.
   (a) Request to Send (to the modem).
      Signals on this connection are generated by the transmitting terminal when it wishes to transmit. The modem carrier signal is transmitted during the on condition of this connection. (With half-duplex operation, the off condition of this connection holds the modem in the receive-data state).
   (b) Clear to Send (to the terminal or computer system).
      Signals on this connection are generated by the transmitting modem to indicate that it is prepared to transmit data. They are a response to the request to send signal from the transmitting device. (With full-duplex operation the modem is in the transmit state at all times).
   (c) Data Set Ready (to the terminal or computer).
      Signals on this connection are generated by the local modem to indicate to the transmitting machine that it is ready to operate. (The following control signals are optional).
   (d) Data Terminal Ready (to the modem).
      When the terminal or computer system sends the on condition on this connection it causes the modem to be connected to the communication line. The off condition causes it to be disconnected in order to terminate a call or free the line for a different use.
   (e) Ring Indicator (to the terminal).
      A signal on the connection informs the terminal that the modem is receiving a ringing signal from a remote location.
   (f) Data Carrier Detector (to the terminal).
      A signal on this connection indicates to the terminal that the carrier (the sign wave that carries the signal) is being received. If the carrier is lost because of a fault condition on the line, the terminal will be notified by an off condition in the connection.
   (g) Data Modulation Detector (to the terminal).
      An on condition on this connection informs the terminal that the signal is being demodulated correctly by the modem. When the quality of the modulation drops below a certain threshold, the terminal may take effective action such as requesting retransmission or requesting that a lower transmission rate be used.
   (h) Speed Selector.
      There are two speed selector connections, one to the modem and one to the terminal. Using them, the transmission rate may be changed.
4. Grounds.
   (a) Protective Ground.
      Attached to the machine frame and possibly to external grounds.
   (b) Signal Ground.
      Establishes the common ground referenced potential for the circuits. When line communication has been established between the central site computer 101 and the modem 104, transmission of data proceeds after the modem has translated the data in a form capable of being transmitted over communication line 105. The data is received by modem 106 which retranslates the data to digital format and transmits it to the receiving computer 107.

Figure 1B:
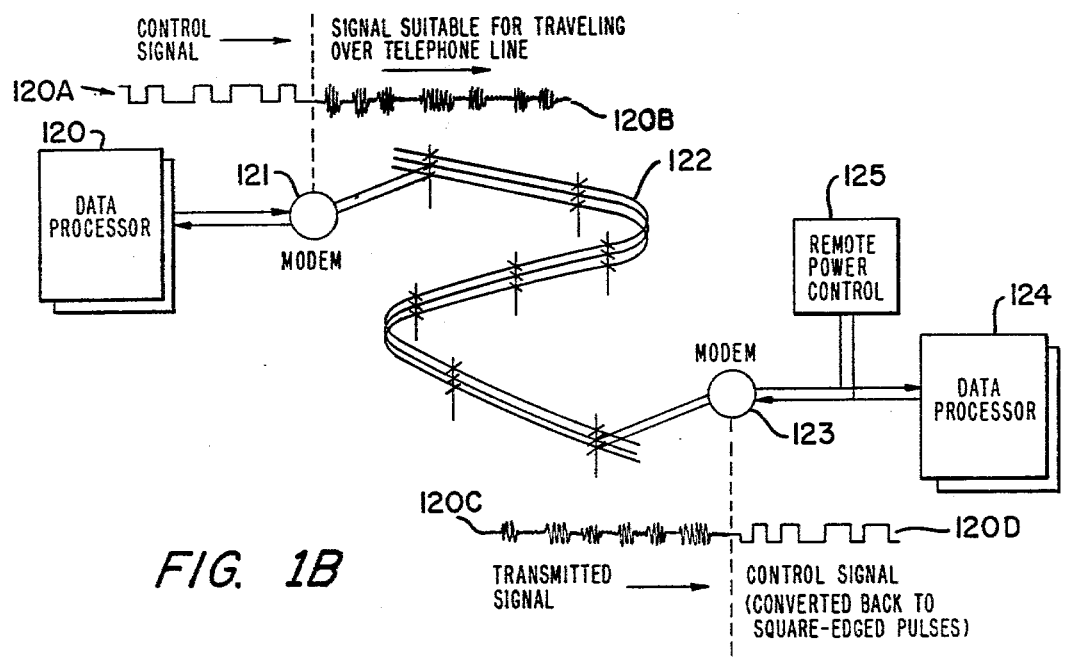
FIG. 1B is a pictorial diagram illustrating the use of the invention in a prior art computer communication system.

FIG. 1B is a block diagram of the invention. The standard interface transmission control unit between the modem and the data processor has not been shown in this diagram for simplicity. With the remote power controller invention 125 the remote site data processor 124 need not be in the powered up condition until the central site data processor 120 wishes to send data to the remote site data processor 124. When that occurs, communication is established between the data processor 120 and the modem 123, either automatically as previously described or by lifting the phone off the receiver and dialing the remote site location. Once telephonic communication has been established with remote site location, typical digital control signals 120A are sent by the data processor 120, which are transformed into typical analog signals 120B, suitable for traveling over telephone lines 122 by modem 121. These signals are then transmitted by communication lines 122 to modem 123 where they are transformed from the analog type signals 120C to the digital type signals 120D and are received in the remote power controller 125 which then performs further operation (to be more fully described infra) in order to power up data processor 124 for receiving data signals.

Figure 2:
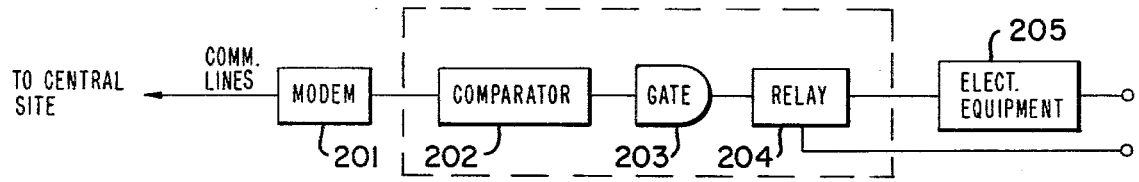
FIG. 2 is a block diagram of the preferred embodiment of the invention.

Referring now to FIG. 2, there is shown a block diagram of the remote power controller 200 for remotely powering up a computer system. After a call from the central site is acknowledged by the modem, the central site transmits the encoded message to identify itself and to indicate the equipment(s) that are to be powered up or powered down. (See U.S. Pat. No.

3,705,385 issued Dec. 5, 1972 for one prior art means of accomplishing this). A comparator 202 verifies and formats this information and if an acceptable match occurs within a specific time period, it provides a signal to gate 203 which enables the gate and activates the relay 204 to apply power to the designated equipment 205. A similar procedure is followed for opening the relay contacts 204 to power down the designated equipment, after the central site indicates that data transmission has been completed.

Figure 3:
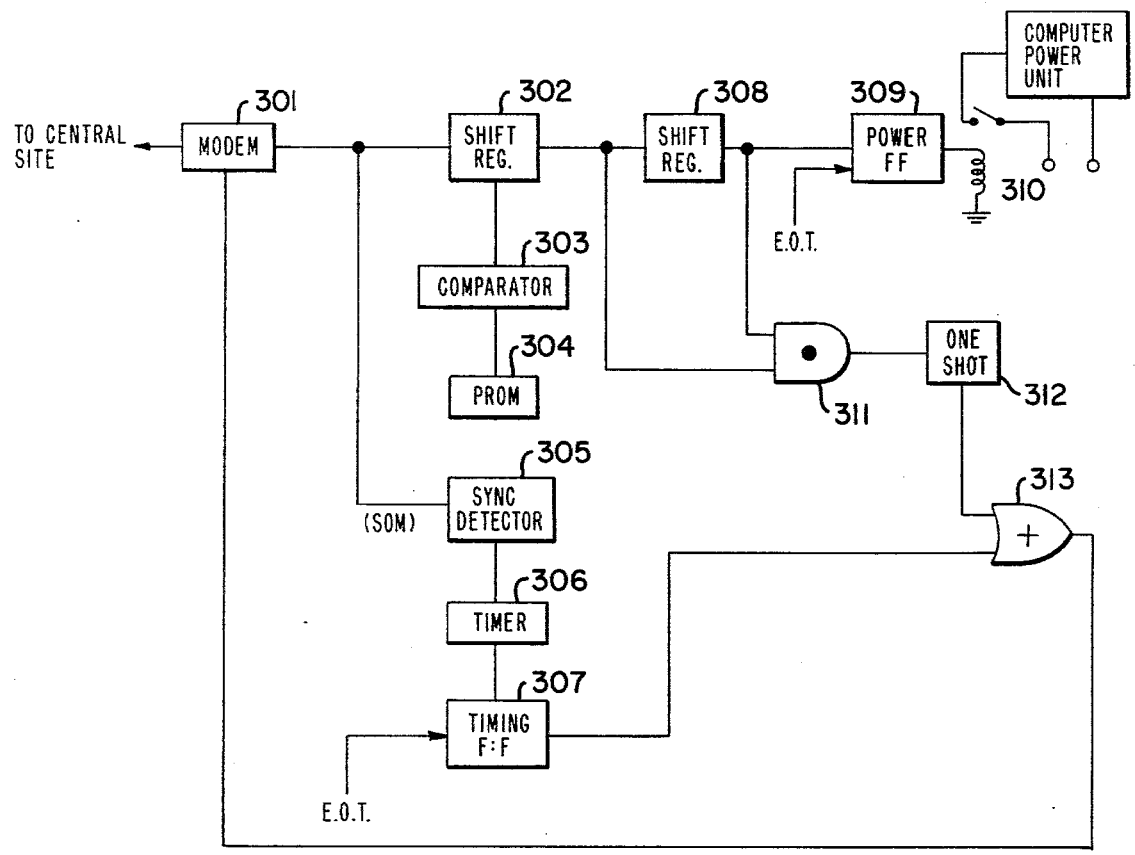
FIG. 3 is a detailed logic block diagram of the preferred embodiment of the invention.

Referring now to FIG. 3, there is shown a detailed logic block diagram of the preferred embodiment of the remote power controller utilizing standard communication lines.

A standard Bell Modem 301 (typically type 208) automatically acknowledges the incoming call and receives the encoded message, in serial form from the central site. The message, typically 4–10 characters long, is transferred to shift register 302 where it is formatted and temporarily stored.

The comparator 303 compares the prestored encoded message, generated by the PROM 304 against the incoming message and for each character that is correctly matched sets each stage in the shift register 308. This continues until a correct match is received for all characters within a specified time interval, typically 100 milliseconds. A more detailed disclosure of this typical comparison with a predetermined quantity is made in U.S. Pat. No. 3,728,688 issued Apr. 17, 1973. When this occurs, a signal is generated to set the power flip-flop 309; this enables relay 310 and power is provided to the computer.

The time interval indicated above is initiated when a start of message signal (SOM) is received by the sync detector 305 from the modem 301. This starts the timer 306 and sets the timing flip-flop 307 for the duration of the predetermined interval. If the total encoded message is (a) incorrectly received, (b) is not received within the specified time interval, or (c) if the end of transmission (EOT) signal is received from the central site, a reset signal is generated by the timer 306 or timing flip-flop 307 and is transmitted via the AND gate 311, one shot 312, and OR 313 gates to cause the modem to "hang-up".

The EOT signal or "end of time interval" signal described above automatically resets the power flip-flop 309, which unlatches the relay 310 and removes power from the computer power unit.

I claim:

1. A remote power controller for turning power on from a central site on computer equipment located on a remote site utilizing standard data communication channels to transmit control and identification signals:
   (a) first means in said central site for transmitting an encoded message to said remote site for identifying said computer equipment that is to be powered on;
   (b) second means in said remote site for acknowledging to said central site that the computer equipment identified by said central site is at the remote site to which the encoded message was transmitted by said first means; and,
   (c) third means in said central site responsive to said second means for transmitting control signals for controlling the powering up of the computer equipment located at the remote site.

2. The remote power controller as recited in claim 1 wherein said second means comprises a PROM for generating a predetermined message and a comparator for comparing the encoded message received with a message generated by said PROM.

3. The remote power controlled as recited in claim 1 including in said remote site a relay apparatus responsive to the control signals for powering up the computer equipment located at the remote site.

4. The remote power controller as recited in claim 3 including in said remote site a sync detector responsive to said control signals for generating a predetermined timing interval during which time communication is established between the central site and the remote site.

5. The remote power controller as recited in claim 4 including in said remote site a disconnect means responsive to the End Of Time (EOT) signal of said control signals for disconnecting the communication channel between the central site and the remote site when the EOT signal is received at said remote site.

6. The remote power controller as recited in claim 4 including in said remote site a disconnect means responsive to a predetermined one of said control signals for disconnecting the communication channel between the central site and the remote site when the information is incorrectly received.

7. The remote power controller as recited in claim 4 including in said remote site a disconnect means responsive to a second predetermined signal of said control signal for disconnecting the communication channel between the central site and the remote site at the end of the predetermined time interval.

8. A remote power controller for turning power off from a central site on computer equipment located on the remote site utilizing standard data communication channels to transmit control and identified signals:
   (a) first means in said control site for transmitting an encoded message to said remote site for identifying said computer equipment that is to be powered off;
   (b) second means in said remote site for verifying the correctness of the message received;
   (c) third means in said remote site for acknowleding to said central site the correctness of the encoded message verified; and,
   (d) fourth means in said central site for transmitting control signals for controlling the powering down of the computer equipment located at the remote site.

9. The remote power controller as recited in claim 8 wherein said second means comprises a PROM for generating a predetermined message and a comparator for comparing the encoded message received with the message generated by said PROM.

10. The remote power controller as recited in claim 8 including in said remote site a relay apparatus responsive to the control signals for powering down the computer equipment located at the remote site.

11. The remote power controller as recited in claim 8 including in said remote site a sync detector responsive to said control signals for generating a predetermined timing interval during which time communication is established between the central site and the remote site.

12. The remote power controller as recited in claim 10 including in said remote site a disconnect means responsive to the End Of Time (EOT) signal of said control signals for disconnecting the communication channel between the central site and the remote site when the EOT signal is received at said remote site.

13. The remote power controller as recited in claim 11 included in said remote site a disconnect means responsive to a predetermined one of said control signals for disconnecting the communication channel between the central site and the remote site when said message is incorrectly received.

14. The remote power controller as recited in claim 4 including in said remote site a disconnect means responsive to a second of said control signals for disconnecting the communication channel between the central site and the remote site when the predetermined time interval expires.

* * * * *